United States Patent [19]

Mitchell

[11] 3,813,970
[45] June 4, 1974

[54] TOOL HOLDER
[75] Inventor: Wallace F. Mitchell, Arlington Heights, Ill.
[73] Assignee: Ammco Tools Inc., North Chicago, Ill.
[22] Filed: Jan. 10, 1972
[21] Appl. No.: 216,484

[52] U.S. Cl. .................................. 82/36 R, 82/4 A
[51] Int. Cl. ............................................. B23b 29/00
[58] Field of Search .......... 82/4 A, 36, 37; 408/180, 408/187

[56] References Cited
UNITED STATES PATENTS
1,323,092   12/1919   Palmer ................................... 82/37
1,383,981   7/1921   Catlin ..................................... 82/36
2,960,765   11/1960  Barrett ................................ 82/4.1 X
3,148,561   9/1964   Krampert ......................... 408/187 X Primary Examiner—Andrew R. Juhasz
Assistant Examiner—William R. Briggs
Attorney, Agent, or Firm—Edmond T. Patnaude

[57] ABSTRACT

A pair of tool bars are mounted on a support member for respective pivotal movement toward or away from a workpiece, the tool bars also being held in longitudinally adjustable positions on the support member by the same pivot members about which they are pivotally movable.

6 Claims, 5 Drawing Figures

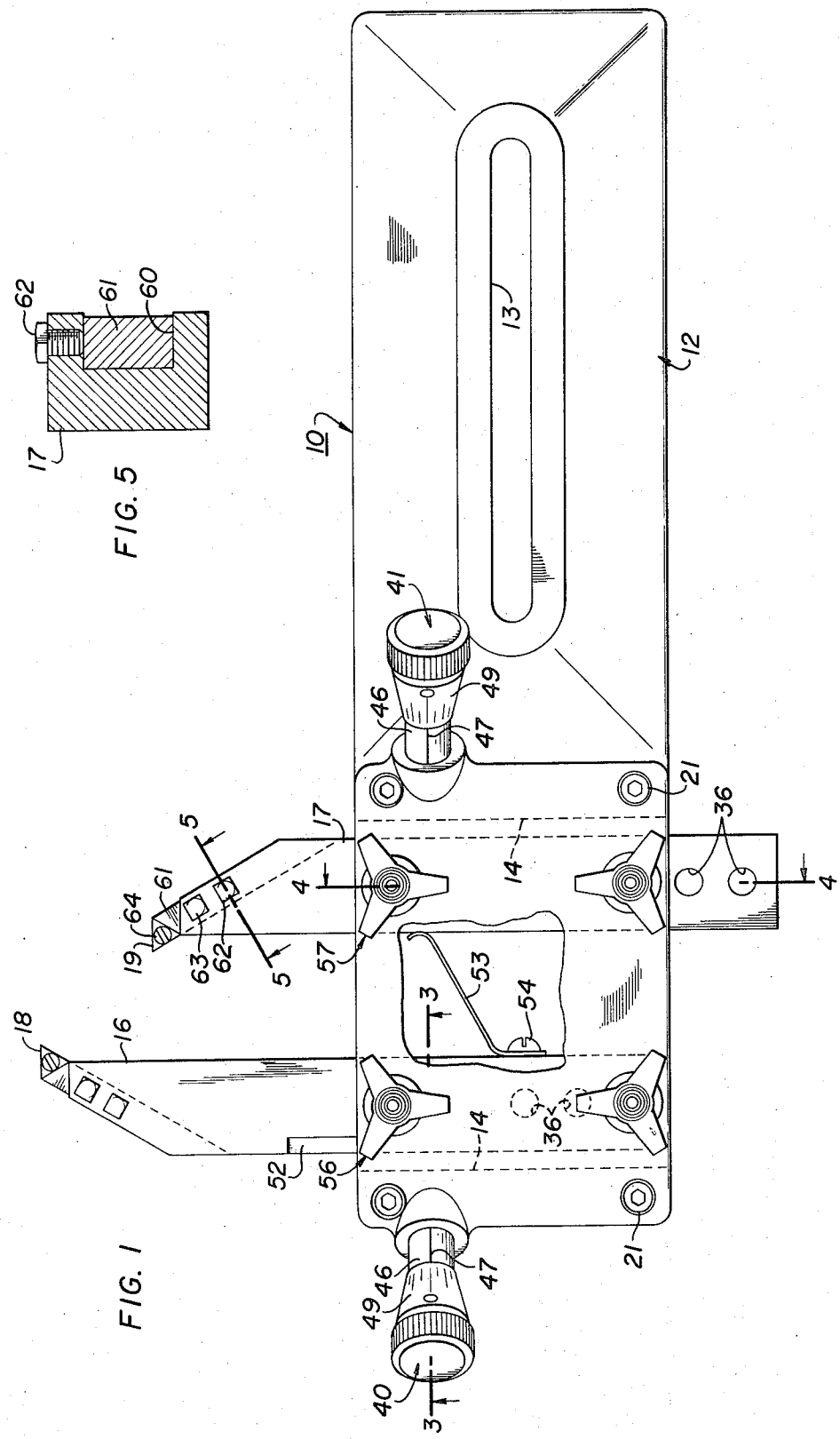

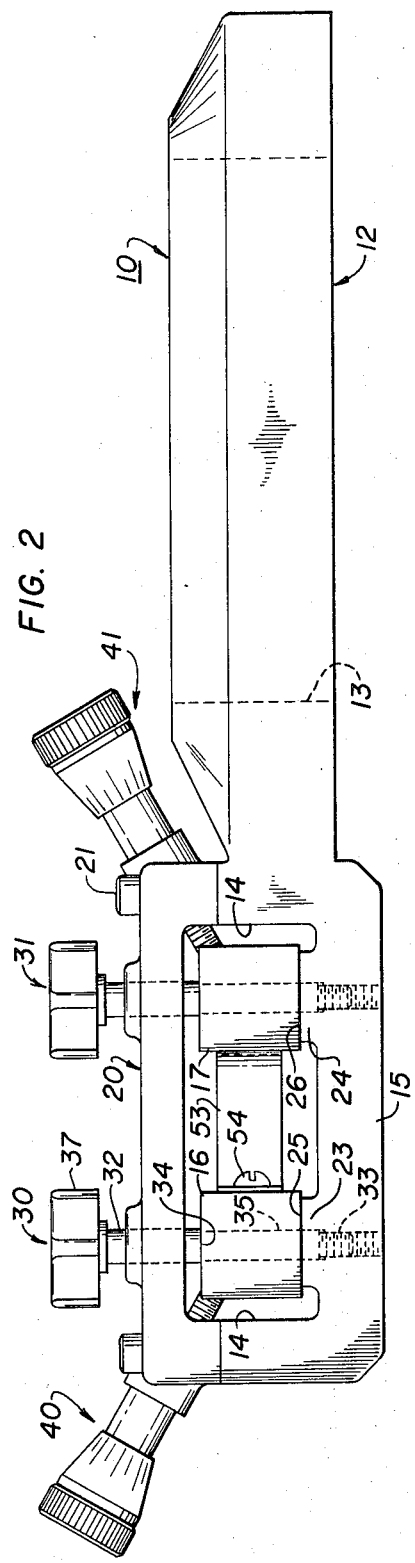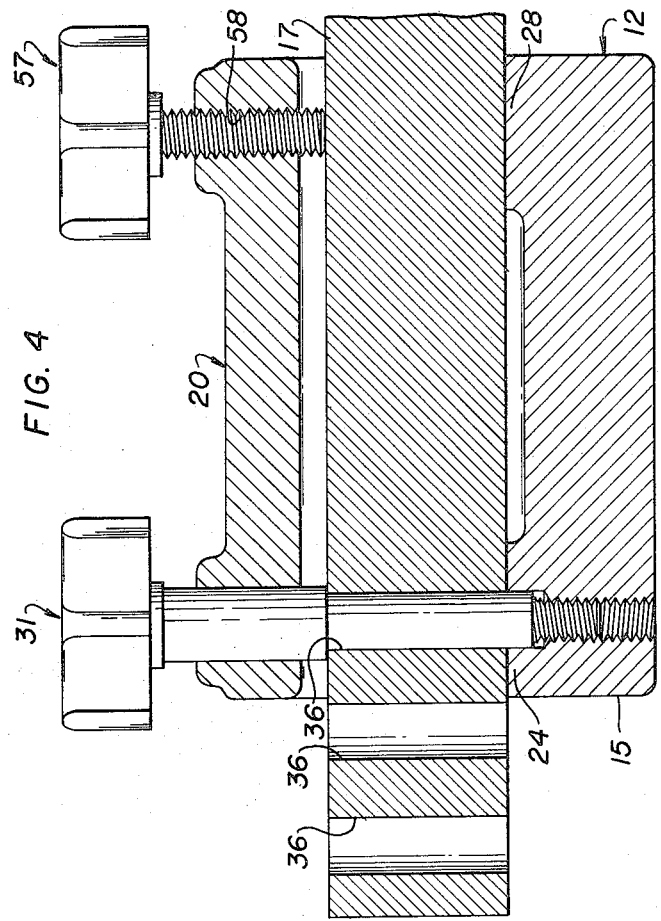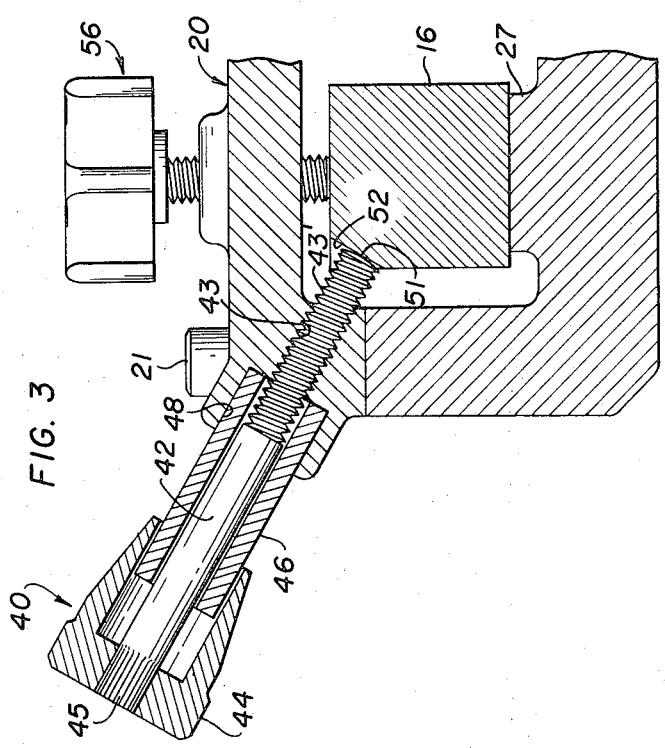

TOOL HOLDER

The present invention relates in general to tool holder attachments for use with lathes, and it relates more particularly to a tool holder for use in simultaneously machining opposite faces of a brake disc or the like rotatably mounted on the associated lathe.

BACKGROUND OF THE INVENTION

The prior art types of tool holders, such as disclosed in pending application Ser. No. 175,145 filed Aug. 26, 1971 and assigned to the same assignee as the present invention, generally comprise tool bit holder bars mounted for longitudinal adjustment in a support member carried by the cross-feed attachment of the lathe. Adjustment of the position of each tool bit is thus limited to a single axis whereby it is difficult if not impossible to use such devices to machine surfaces which are adjacent to flanges and other abutments. Moreover, such devices are only usable for conventional resurfacing with tool bits since they are not readily adaptable for use with other accessories.

OBJECTS OF THE INVENTION

Therefore, an object of the present invention is to provide a new and improved tool holder providing a wide range of adjustments of the position of a tool held thereby.

Another object of this invention is to provide a new and improved tool holder for use with a lathe.

A further object of this invention is to provide such a tool holder for supporting two tools at adjustable controlled positions relative to a workpiece mounted on the spindle of the lathe.

SUMMARY OF THE INVENTION

Briefly, the above and further objects may be realized in accordance with the teachings of the present invention by mounting a pair of tool holder bars for both longitudinal and pivotal adjustment in a support member mounted on the cross-feed assembly of a lathe. A tool bit carrying piece or other accessory is mounted near the forward end of each tool holder bar for linear adjustment along an axis extending at an angle relative to the longitudinal axis of the associated tool holder bar.

BRIEF DESCRIPTION OF THE DRAWINGS

Further objects and advantages and a better understanding of the invention may be had from the following detailed description taken in connection with the accompanying drawings, wherein:

FIG. 1 is a plan view of a tool holder assembly embodying the present invention;

FIG. 2 is a front elevation of the device shown in FIG. 1;

FIG. 3 is a fragmentary sectional view taken along the line 3—3 of FIG. 1;

FIG. 4 is a fragmentary sectional view taken along the line 4—4 of FIG. 1; and

FIG. 5 is a sectional view taken along the line 5—5 of FIG. 1.

DETAILED DESCRIPTION OF THE DRAWINGS

Referring now to the drawings and particularly to FIGS. 1 and 2 thereof, there is shown a tool holder assembly 10 which is adapted to be mounted on the cross-feed assembly of a lathe for facing brake discs and the like mounted on the spindle of the associated lathe. The tool holder 10 includes a main support member 12 which may be a metal casting and which is provided with an elongated mounting slot 13 for adjustably mounting the support 12 on the cross-feed of the lathe. The left hand portion of the support member 12 as illustrated in FIGS. 1 and 2 is provided with a transverse channel 14 including a base portion 15. Mounted in the channel 14 is a pair of tool holding bars 16 and 17 to the forward ends of which are respectively mounted a pair of tool bits 18 and 19. A cover plate 20 is fastened to the support member 12 over the channel 14 by a plurality of Allen head set screws 21. The base portion 15 is provided with a pair of rearwardly disposed upstanding bosses 23 and 24 which have coplanar flat surfaces 25 and 26 on respective ones of which the tool bars 16 and 17 rest. The forward side of the base portion 15 is similarly provided with upstanding bosses 27 and 28 (best shown in FIGS. 3 and 4) whose upper surfaces are also coplanar with the rearward boss surfaces 25 and 26 on which the intermediate portions of the tool bars 16 and 17 rest. As best shown in FIGS. 3 and 4 the bars 16 and 17 have flat bottom surfaces which are adapted to slide on the bosses 23, 24, 27 and 28.

The tool bars 16 and 17 are pivotally supported in the support member 12 by means of a pair of pivot members 30 and 31. The pivot members 30 and 31 are identical and as best shown in FIG. 2 include a rod 32 having a reduced diameter threaded end portion 33 threadedly received in the base 15. A downwardly facing shoulder 34 engages the upper surface of the associated tool bar and an unthreaded shank portion 35 extends through a selected one of a plurality of spaced apart holes 36 in the tool bars 16 and 17. Accordingly, the bars 16 and 17 may be adjustably positioned along their respective longitudinal axis by selection of the particular holes 36 through which the pivot members extend. A knob 37 is mounted to the upper end of the rod 32 to facilitate use thereof.

In order to permit angular adjustment of the tool bars 16 and 17 about the pivot members 30 and 31, a pair of depth-of-cut adjustment assemblied 40 and 41 are provided. Inasmuch as the assemblies 40 and 41 are identical only the assembly 41 as shown in detail in FIG. 3 is described herein. It includes a rod 42 having a threaded end portion 43 threadedly received in a hole 43 in the cover plate 20. A control knob 44 is fixed to the end of the rod 43 by suitable means such as a spline connection 45, and a sleeve 46 provided with an index line 47 is press fitted into a counterbore 48 in the cover plate 20. The control knob 41 is provided with graduations as indicated at 49 which, in cooperation with the index line 47, may be used to indicate the depth of cut. The distal end 51 of the rod 42 is provided with a convex generally spherical surface which engages the tool bar 16 near the forward side of the support member 12. The upper left hand edge of the tool bar 16 as viewed in FIG. 2 is provided with a notched out portion having a flat surface 52 lying perpendicular to the longitudinal axis of the rod 42 so that as the rod 42 is threaded into the hole 43 in the cover plate 20 the bar 16 is pivoted about the pivot member 30 in a clockwise direction as viewed in FIG. 1. Movement in a clockwise direction moves the tool bit 18 towards the workpiece which during normal use of the tool holder 10 is located between the tool bits 18 and 19. The tool bars 16 and 17 are held in engagement with the depth-of-cut adjustment assemblies 40 and 41 by means of a flat spring 53 which is mounted on the tool bar 16 and held in place by a screw 54.

In order to hold the tool bars 16 and 17 in the adjusted positions, a pair of clamp screws 56 and 57 extend through and are threadedly received in suitably tapped holes in the cover plate 20. As shown in FIG. 4 the screw portion of the clamp member 57 extends through a threaded opening 58 in the plate 20.

In order to mount the tool bits 18 and 19 to the tool bars 16 and 17, the ends of the tool bars are provided with an angularly extending open channel. As best shown in FIG. 5, the bar 17 is provided with a channel 60 in which is slidably mounted a bar 61 having a rectangular cross-sectional shape complementing the shape of the channel 30. The bar 61 is held in the adjusted position in the channel 60 by a pair of clamping screws 62 and 63. As best shown in FIG. 1, the bar 61 thus extends forwardly and inwardly of the tool bar 17 and is provided with a triangular mounting surface on which the associated tool bit 19 is mounted by means of a screw 64. It will be apparent to those skilled in the art that different tools may be mounted in the channels at the forward ends of the tool bars 16 and 17.

It may thus be seen that with the tool holder of the present invention the tool bits 18 and 19 are longitudinally adjustable in directions transverse to the longitudinal axis of the spindle of the associated lathe and, in addition, are movable toward and away from the faces of the disc or other workpiece being machined. In addition, where the disc whose faces are to be resurfaced includes a circumferential flange the tool bit supporting bars 61 are longitudinally adjustable to further adjust the distance between the cutting edges of the tool bits and the inner sides of the tool bars 16 and 17.

While the present invention has been described in connection with a particular embodiment thereof, it will be understood that those skilled in the art may make many changes and modifications without departing from the true spirit and scope thereof. Accordingly, the appended claims are intended to cover all such changes and modifications as fall within the true spirit and scope of the present invention.

What is claimed is:

1. A tool holder for use with a lathe, comprising a support member adapted to be mounted on a lathe,
   a pair of tool bars each having a guideway at one end for receiving a cutting tool,
   said guideways extending at an angle relative to the longitudinal axis of the associated tool bar,
   guide means for supporting said tool bars for axial and pivotal movement in a common plane on said support member,
   a pair of pivot members carried by said support member and respectively extending into axially spaced recesses in said tool bars for pivotably mounting said tool bars on said guide means, and
   depth-of-cut adjustment means including a pair of threaded rods extending through said support member into respective engagement with said tool bars at locations spaced from said pivot members for respectively pivoting said tool bars about said pivot members on said guide means.

2. A tool holder for use with a lathe, comprising a support member adapted to be mounted on a lathe,
   a pair of tool bars, each having a guideway at one end for respectively receiving a cutting tool,
   said guideways extending at an angle relative to the longitudinal axis of the associated tool bar,
   guide means for supporting said tool bars for axial and pivotal movement in a common plane on said support member,
   a pair of pivot members threadedly received in said support member and extending into selected ones of a plurality of axially spaced recesses in said tool bars for pivotably mounting said tool bars to said guide means, and
   depth-of-cut adjustment means including a pair of threaded rods extending through said support member into respective engagement with said tool bars at locations spaced from said pivot members for respectively pivoting said tool bars about said pivot members.

3. A tool holder according to claim 1, further comprising
   a pair of clamp members for respectively clamping said tool bars in the adjusted positions.

4. A tool holder for use with a lathe, comprising
   a support member adapted to be mounted on a lathe,
   a pair of tool bars each having means thereon for receiving a cutting tool,
   guide means for movably supporting said tool bars on said support member,
   a pair of pivot members pivotally securing said tool bars to said support member on said guide means,
   depth-of-cut adjustment means for respectively pivoting said tool bars around said pivot members in said guide means, and
   spring means for urging said tool bars against said depth-of-cut adjustment means.

5. A tool holder for use with a lathe, comprising
   a support member adapted to be mounted on a lathe,
   a pair of tool bars each having means thereon for receiving a cutting tool,
   guide means for movably supporting said tool bars on said support member,
   a pair of pivot members pivotally securing said tool bars to said support member on said guide means,
   depth-of-cut adjustment means for respectively pivoting said tool bars around said pivot members in said guide means, and
   a unitary spring compressed between said tool bars for urging said tool bars against said depth-of-cut adjustment means.

6. A tool holder according to claim 5 wherein said spring is mounted on one of said tool bars.

* * * * *